(12) United States Patent
Rasmussen et al.

(10) Patent No.: US 7,654,693 B2
(45) Date of Patent: Feb. 2, 2010

(54) ABSOLUTE FIXTURE POSITIONING

(75) Inventors: Niels Joergen Rasmussen, Egaa (DK); Torben Kaas Rasmussen, Aarhus N (DK)

(73) Assignee: Martin Professional A/S, Aarhus N (DK)

( * ) Notice: Subject to any disclaimer, the term of this patent is extended or adjusted under 35 U.S.C. 154(b) by 0 days.

(21) Appl. No.: 12/107,826

(22) Filed: Apr. 23, 2008

(65) Prior Publication Data

US 2009/0231850 A1 Sep. 17, 2009

(30) Foreign Application Priority Data

Mar. 17, 2008 (DK) ................. 2008 00408

(51) Int. Cl.
*F21V 21/00* (2006.01)
(52) U.S. Cl. .................. 362/249.07; 362/286; 362/419; 362/249.09
(58) Field of Classification Search ............... 362/285, 362/287, 418, 419, 422, 423, 425, 249.1, 362/249.07, 249.09, 238, 249.03, 286
See application file for complete search history.

(56) References Cited

U.S. PATENT DOCUMENTS

| 557,371 A | 3/1896 | Ferguson |
| 4,353,110 A * | 10/1982 | Ellis ............... 362/35 |
| 4,716,344 A | 12/1987 | Newell et al. |
| 5,140,507 A * | 8/1992 | Harwood ............... 362/271 |
| 5,842,768 A * | 12/1998 | Menke ............... 362/35 |
| 6,764,198 B2 | 7/2004 | Chang |
| 6,902,302 B2 | 6/2005 | Foster |
| 7,080,928 B2 * | 7/2006 | Barnhart et al. ............ 362/465 |
| 7,121,706 B2 * | 10/2006 | Takiguchi et al. ........... 362/524 |

FOREIGN PATENT DOCUMENTS

| GB | 2 417 842 A | 3/2006 |
| WO | 2006/075297 A1 | 7/2006 |
| WO | 2008/013372 A1 | 1/2008 |

* cited by examiner

*Primary Examiner*—Thomas M Sember
(74) *Attorney, Agent, or Firm*—David S. Safran; Roberts Mlotkowski; Safran & Cole, P.C.

(57) ABSTRACT

A lighting fixture having at least one internal processor and at least one fixed element to which controllable moving elements are rotatably fastened, one moving element having at least one light source that generates a beam of light. Information concerning positions of moving components in a lighting fixture is automatically achieved. Correct position indication at start up is obtained without moving the components to their end stops for finding set points for step motors by the provision of at least one absolute encoding device, which encoding device indicates the angular movement of a first input axel in relation to the encoding device, which absolute encoding device has a gearbox with a second internal axel, which first input axle drives a first toothed timing wheel, intermeshing with a second toothed timing wheel that rotates the second axel with a angular velocity different from the angular velocity of the first input axle.

5 Claims, 4 Drawing Sheets

ABSOLUTE FIXTURE POSITIONING

BACKGROUND OF THE INVENTION

1. Field of the Invention

The present invention relates to a lighting fixture comprising at least one fixed element, to which fixed element controllable moving elements are rotating fastened, where one moving element comprises at least one light source, which light source generates a beam of light, which lighting fixture comprises at least one internal processor.

2. Description of Related Art

By operating light fixtures, it is well-known that these light fixtures can be placed in different positions. When a light fixture is placed in a rig, the position of the base is fixed. Often light fixtures are used for a show and are as such in operation for a short period of time and then the light fixtures are sent back to storage from where they are sent for the next show. By this way of operation, there are no rules for how a light fixture is positioned. Therefore, typical light fixtures are designed so that their cooling demand is independent on the position of the light fixture. This can lead to a situation where more cooling energy is used for operating blowing means than necessary.

From state of the art, position detectors are well-known as electronic integrated circuits which based on gravity can tell the actual position in relation to three orthogonal axes. These integrated circuits are known for different purposes such as changing the direction of an LCD display independent on how e.g. a mobile phone is orientated.

SUMMARY OF THE INVENTION

It is the scope of the invention is to automatic achieving information concerning positions of moving components in a lighting fixture. A further scope of the invention is to achieve correct position indication without at start up moving the components to their end stops for finding set points for step motors.

This can be achieved in a lighting fixture as described in the preamble to claim 1 if the lighting fixture further comprises at least one absolute encoding devices, which encoding devices are indicating the angular movement of a first input axel in relation to the encoding device, which absolute encoding devices comprises a gearbox, which gearbox comprises a second internal axel, which first input axle is driving a first toothed timing wheel, which first toothed timing wheel is intermeshing with a second toothed timing wheel, which second toothed timing wheel rotates the second axel with a angular velocity different from the angular velocity of the first input axle.

By using magnetic detection the position or angular velocity detection of the two axles are made in a highly reliable way without any risk of being disturbed from smoke or dust. By using a gearbox and using magnetic position and angular velocity indication of both axles, the signals that are achieved from the magnetic detectors are digital values which through a data bus can immediately be transmitted into a processor. In the processor, the digital values can be calculated as if it was oscillating signals that were detected and using oscillating signals the phase difference between two signals having different frequency will indicate the actual position. If the two frequencies are rather close to each other, several rotations of the axle have to be fulfilled before the same phase difference occurs again. In the present invention, the repetition of a phase difference will occur long after the pan or tilt in a light fixture has reached its end stop. A method is therefore achieved, that in all kind of operation that will give an exact position indication to the computer system. If the actual position is indicated and stored in the system, there is no need for performing a manual movement to one of the end positions at start up. The light fixture can start up immediately because the actual position is well-known.

It is preferred that the first and second axles comprises magnets at the axle ends, which magnets generates a magnetic field mostly perpendicular to the longitudinal direction of the axels, which magnets each facing a sensor PCB which sensor PCB transmit the signals from the sensors to the internal processor. The sensor PCB could comprise an attended programmable magnetic rotary encoder. For example, AS 5040 from Austrian Micro is a system one chip combining integrated hall element, analog front and a digital signal processing in a single device. It provides incremental output signals and the absolute angular position of a magnet that is placed above or below the device. Using that kind of integrated circuits, a highly reliable position indication can be achieved.

The absolute encoding can be provided for at least pan and tilt by an encoding module connected to both pan and tilt motors. In a light fixture it is highly effective to use the encoding module for indicating pan and tilt because these are some of the most critical moving systems in a lighting fixtures and the only moving of the light fixture that is seen directly from the outside. The encoding module can also be used internally in the light fixture for indicating e.g. position of a zoom lens system. Another possible use will be measuring the actual position of a gobo holder and also for indicating the actual position of rotating gobos. Also indicating a position of e.g. colour flags in a colour change module could be important.

It is preferred that the absolute encoding module will touch the timing belt on the tooth side. For indicating pan or tilt in a light fixture, one of the most effective ways of placing the encoding module is to let a wheel at the module be in touch with the timing belt toothed side. In this way, at least a complete indication of the belt is achieved. Because the belt is toothed there is no doubt that it results in a very precise indication of the actual position of the pan or tilt movement.

In a preferred embodiment there are a hard stop and switch for reset for both PAN/TILT movements. Even the most effective position system needs, at least for the first time, before operation is started, a reset possibility. In the reset situation, it is mostly effective that it happens if the lighting fixture reaches the outer position for one of its movements.

By a product as described in the pending patent application it is possible to limit pan and tilt extreme positions and thereby allowing to hang products closer or product against vertical surface.

Minimum number of teeth of pulleys can be 14 and the other can be e.g. 14+1 or 2.

DETAILED DESCRIPTION OF THE INVENTION

Figure 1:
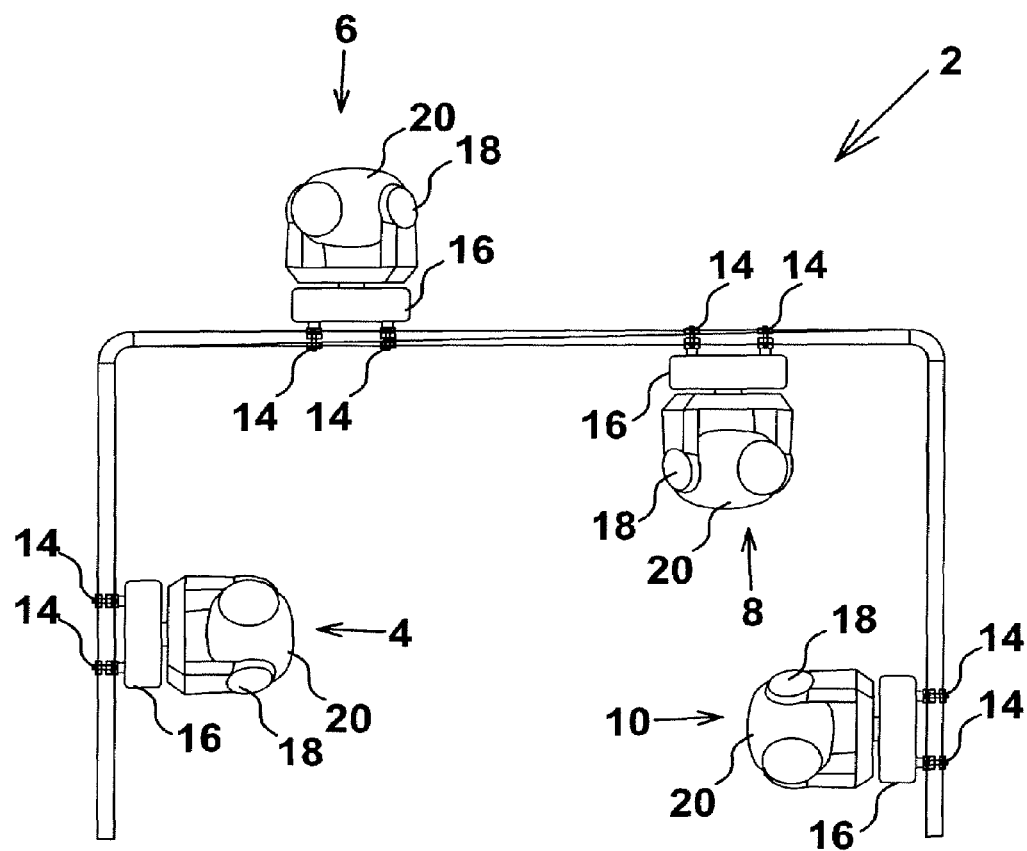
FIG. 1 shows a system for generating a light show.

FIG. 1 shows a system 2 for generating a light show is indicted with the light fixtures 4,6,8 and 10. These light fixtures 4 to 10 are all fixed to a bar 12 by fastening means 14. The fastening means 14 are fixing clamps. The light fixtures 4 to 10 all comprises a fixture 16 which are rotationally connected to a yoke 18 which yoke 18 is rotationally connected to a head 20.

A complicated light fixture as the one indicated in 4 to 10 comprises blowing means in the base 16 as well as in the yoke 18 and as several blowing fans in the head 20. The cooling demand might depend on the actual orientation of the head 20. But also in the base 16 as well the yoke 18, the position has influence on the cooling demand.

Figure 2:
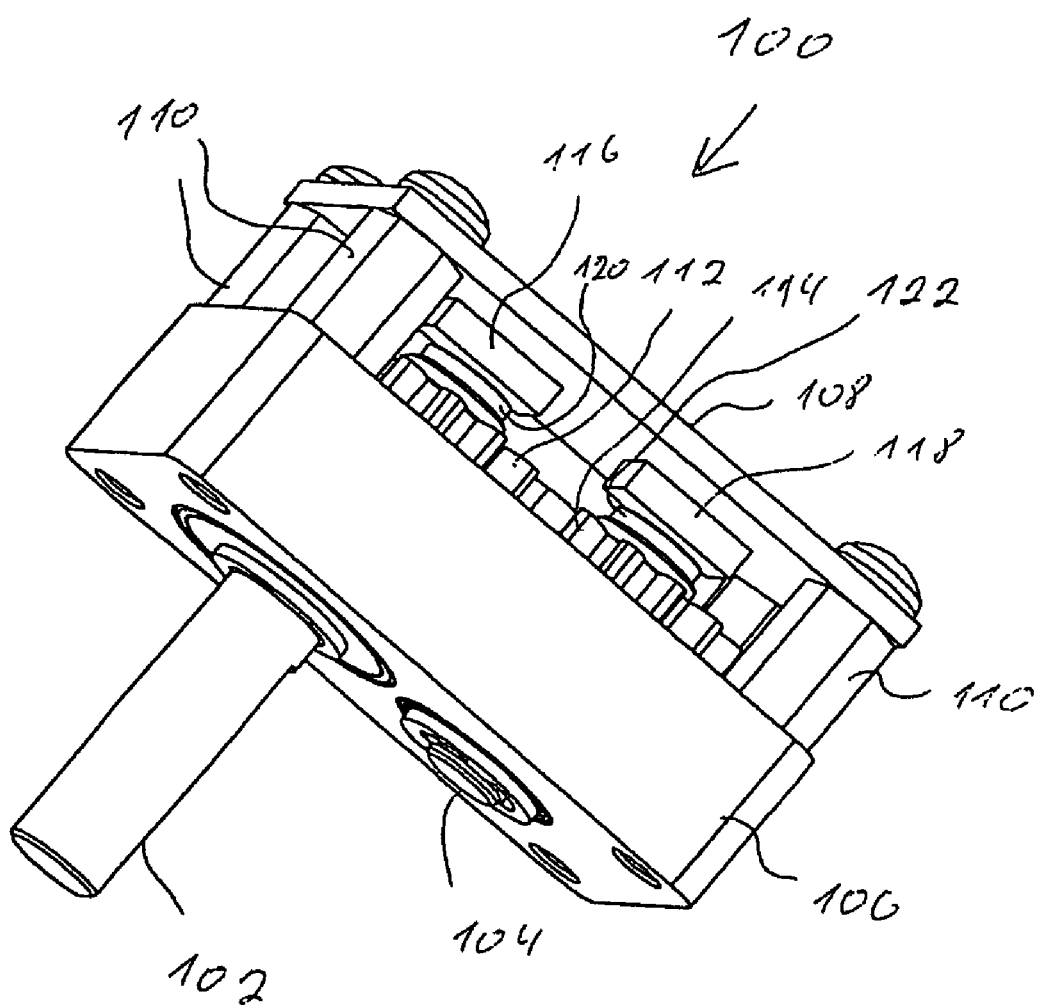
FIG. 2 shows a side view of an encoding module.

FIG. 2 shows an absolute encoding module 100 comprising an input axle 102 and a second axle 104. These axles 102,104 are supported by means of bearings inside a housing 106. An end plate 108 is by means of bolts 110 connected to the housing 106. The input shaft 102 is connected to a first toothed wheel 112 and the second shaft 104 is connected to tooth wheel 114. Placed at the end plate 108 is shown magnetic detecting devices 116 and 118. These magnetic detection devices 116,118 are cooperating with magnets 120 and 122 which are connected to the end of the shafts 102 and 104.

In operation, the rotation of the input shaft 102 will be indicated by the magnetic detector 116. But at the same time as the input shaft 102 starts rotating the toothed wheel 112 is interacting with the toothed wheel so that the shaft 104 is rotated as well. Because there is a difference in the number of tooth at the toothed wheel 112 and 114, the shaft 104 will rotate at a speed slower or faster than the shaft 102. These differences in velocity of the shafts 102,104 will result in a sufficient difference in the signals indicated by the magnetic detectors 116 and 118. Hereby an electronic microprocessor can achieve a highly accurate angular position of the shaft 102. This position will be highly accurate even if the shaft 102 is turned in several rotations in one or another direction which is sufficient for precise indication of the position in pan or tilt of a light fixture.

Figure 3:
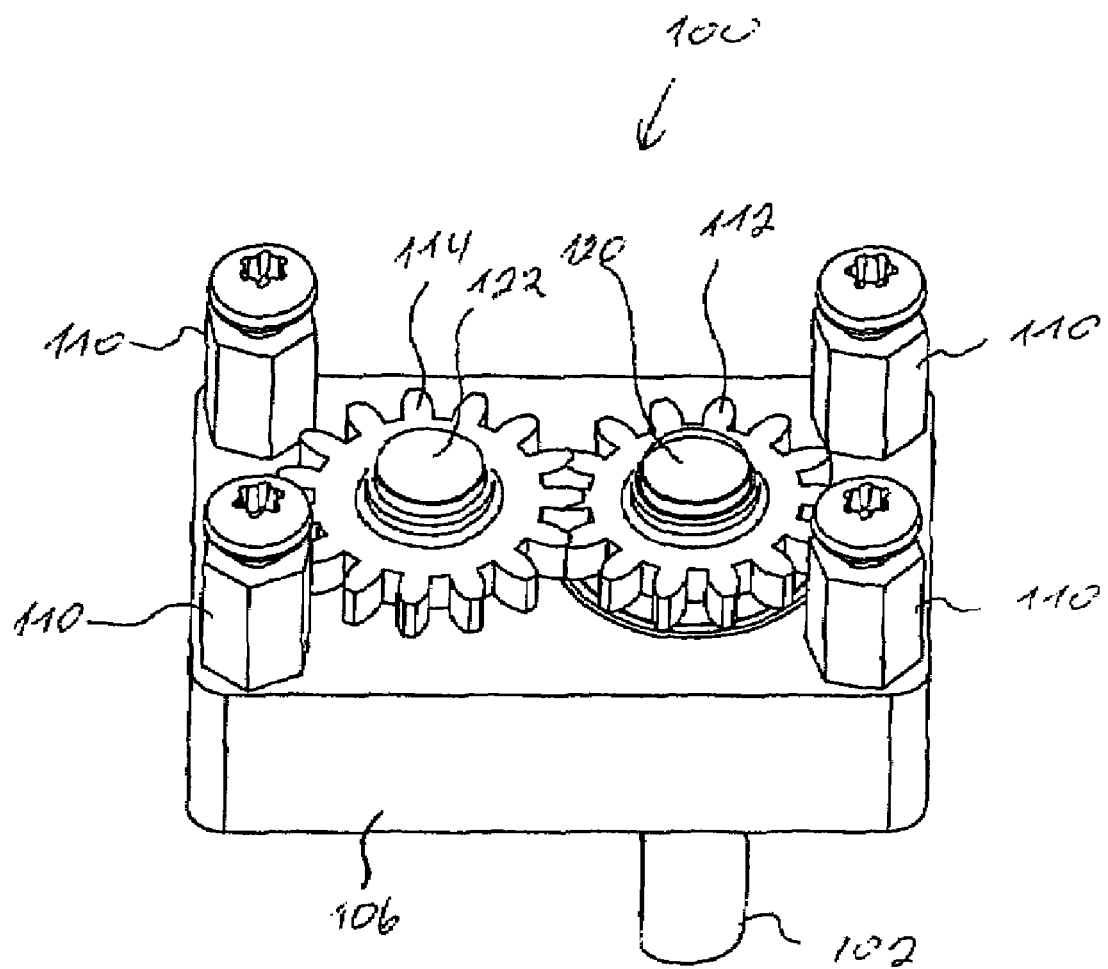
FIG. 3 shows the same module as in FIG. 2, but with the sensors removed

FIG. 3 shows the same embodiment as FIG. 2, but seen from the backside and the end plate and the magnetic detectors are removed. FIG. 3 shows the input shaft 102 placed in the housing 106. The bolts 110 are also indicated. The toothed wheels 112 and 114 are interfering with each other. The magnets 120 and 122 are also shown.

In an alternative embodiment, it is possible to achieve mostly the same effect by using two axles which are interconnected by the same belt but where wheels on the rotating axles have different diameters. Instead of letting toothed wheels in interact; it is possible to let the wheels connected by e.g. a belt. In another embodiment where space maybe not sufficient, it is possible at an existing belt connected from a driving motor to a rotating element somewhere there is sufficient room to get in contact with that belt to use a wheel that is rotating a magnet in relation to a magnetic detector. Placing two of these detecting elements along the same belt and letting the wheels that have been driven by the belt having a different diameters, it is possible to achieve that effect that the magnetic detectors will deliver signals having different frequencies. It is to be understood that each detector could deliver a sinus signal. When two sinus signals having different frequency are compared very long time differences can occur before the same position of both sinus curves are achieved. Therefore rotating of the wheels can be performed for several rotations and there will still be a total position indication.

Figure 4:
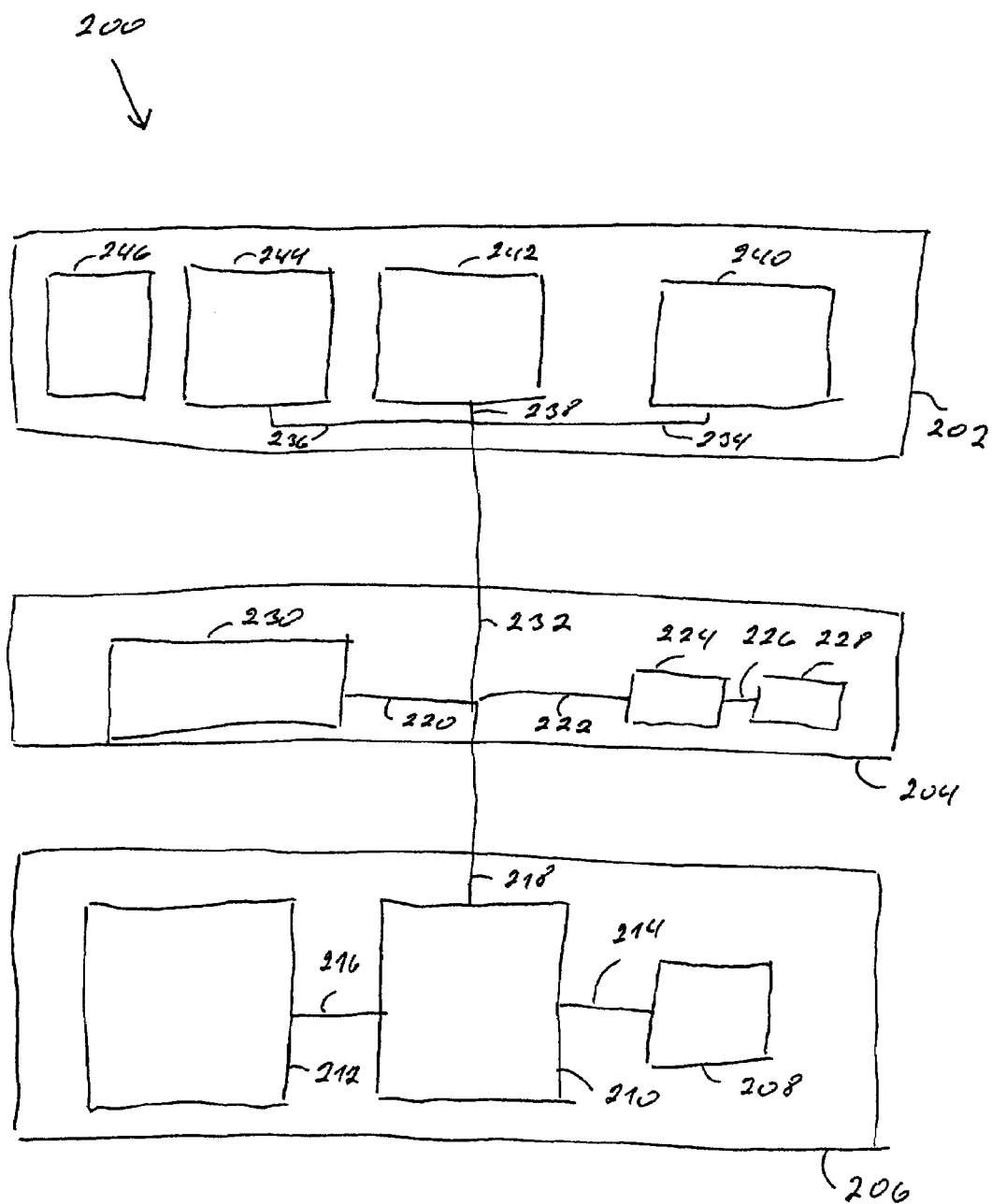
FIG. 4 shows a schematic view of the electrical data communication in a light fixture.

FIG. 4 shows a schematic view of the electrical data communication in a light fixture 200. A head 202 is communicating with a yoke 204 which further is communicating with a base 206. The base 206 comprises an orientation sensor 208 which is communicating with a controller board 210. Further, the base 206 comprises a power unit 212. A first data bus 214 communicates between the orientation sensor 208 and the controller board 210. A further data bus 216 communicates between the controller board 210 and the power unit 202.

A further data bus 218, is communicating towards the yoke 204. Here the data bus 218 is split up in two separate data buses 220 and 222. The data bus 222 is connected towards a first absolute encoder 224 where the data bus 226 further connects to a second absolute encoder 228. The data bus 220 is connected to a motor driver module 230.

The data bus 218 is further connected to a data bus 232 which is connecting the head 202 with the yoke 204. The data bus 232 is, when arriving in the head, split up in one data bus 234, a second data bus 236 and the third data bus 238. The data bus 234 is connected to a fan controller 240. The databus 236 is connected to a motor drive module 244 which comprises drivers for zoom or focus in the light fixture. Further, the data bus 238 is connected to a projection module 242 which comprises optical elements such as gobos. Further, in the head 202 a lamp module 246 is shown.

In operation, the controller board 210 will be in communication with the orientation sensor 208 and also with first and the second absolute encoders 224 and 228. All these information is transmitted over the data buses 218, 232, 234 to the fan controller 240. This fan controller also receives input from not shown temperature sensors placed in the head. Based on these inputs the fan controller 240 is able to predict the cooling demand and adjust the blowing means placed in the head, but also in the yoke and the base depending on not only the actual cooling demand but also the predicted cooling demand.

What is claimed is:

1. A lighting fixture comprising at least one fixed element, to which fixed element controllable moving elements are rotating fastened, where one moving element comprises at least one light source, which light source generates a beam of light, which lighting fixture comprises at least one internal processor, wherein the lighting fixture comprises at least one absolute encoding devices, which encoding devices are indicating the angular movement of a first input axel in relation to the encoding device, which absolute encoding devices comprises a gearbox, which gearbox comprises a second internal axel, which first input axle is driving a first toothed timing wheel, which first toothed timing wheel is intermeshing with a second toothed timing wheel, which second toothed timing wheel rotates the second axel with a angular velocity different from the angular velocity of the first input axle wherein the first and second axles comprises magnets at the axle ends, which magnets generates a magnetic field mostly perpendicular to the longitudinal direction of the axles, which magnets each facing a sensor PCB which sensor PCB transmit the signals from the sensors to the internal processor.

2. A light fixture according to claim 1, wherein an electronic circuit analyses the signals generated by the magnetic censors PCBs, where the actual phase is measured for each magnetic censor PCB, which electronic circuit estimate the actual position based on the phase difference measured between the two magnetic censor PCBs.

3. A light fixture according to claim 2, wherein absolute encoding is provided for at least pan and tilt by an encoding module connected to pan and tilt motors.

4. A light fixture according to claim 3, wherein the absolute encoding module will touch the timing belt on the tooth side.

5. A light fixture according to claim 4, wherein the light fixture comprises a hard stop and switch for reset both PAN/TILT movements.

* * * * *

UNITED STATES PATENT AND TRADEMARK OFFICE
Certificate

Patent No. 7,654,693 B2                                Patented: February 2, 2010

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Torben Kaas Rasmussen, Aarhus N (DK); and Thomas Vinther, Beder (DK).

Signed and Sealed this Eighteenth Day of February 2014.

JONG-SUK (JAMES) LEE
*Supervisory Patent Examiner*
Art Unit 2885
Technology Center 2800